United States Patent [19]

Pouilloux

[11] 3,935,894
[45] Feb. 3, 1976

[54] TIRE HAVING ENDS OF CARCASS CORDS EXTENDING CIRCUMFERENTIALLY IN BEAD AREA

[75] Inventor: Jacques Pouilloux, Gratien, France

[73] Assignee: Pneumatiques, Caoutchouc Manufacture et Plastiques Kleber-Colombes, France

[22] Filed: Mar. 27, 1975

[21] Appl. No.: 562,397

[30] Foreign Application Priority Data
Mar. 29, 1974 France............................ 74.11084

[52] U.S. Cl........... 152/356; 152/362 R; 156/110 C
[51] Int. Cl.² ...................... B60C 9/08; B60C 15/04
[58] Field of Search................ 152/354, 356, 362 R; 156/110 C, 422

[56] References Cited
UNITED STATES PATENTS

| 1,559,142 | 10/1925 | Ames............................. 152/362 R |
| 3,044,523 | 7/1962 | Drakeford et al............... 152/362 R |
| 3,480,065 | 11/1969 | Verdier............................... 152/354 |
| 3,675,702 | 7/1972 | Schroeder........................... 152/356 |
| 3,815,652 | 6/1974 | Pouilloux....................... 152/362 R |

Primary Examiner—Drayton E. Hoffman
Attorney, Agent, or Firm—Craig & Antonelli

[57] ABSTRACT

A tire of the type having a radial carcass formed of meridian arcs or hoops of individual cords in which the ends of the individual cords are bent in the area of each bead, and are extended by portions that are circumferentially directed and juxtaposed with the like circumferential portions of the adjoining hoop in the form of longitudinal bundles which make up the reinforcing structure of the beads.

10 Claims, 14 Drawing Figures

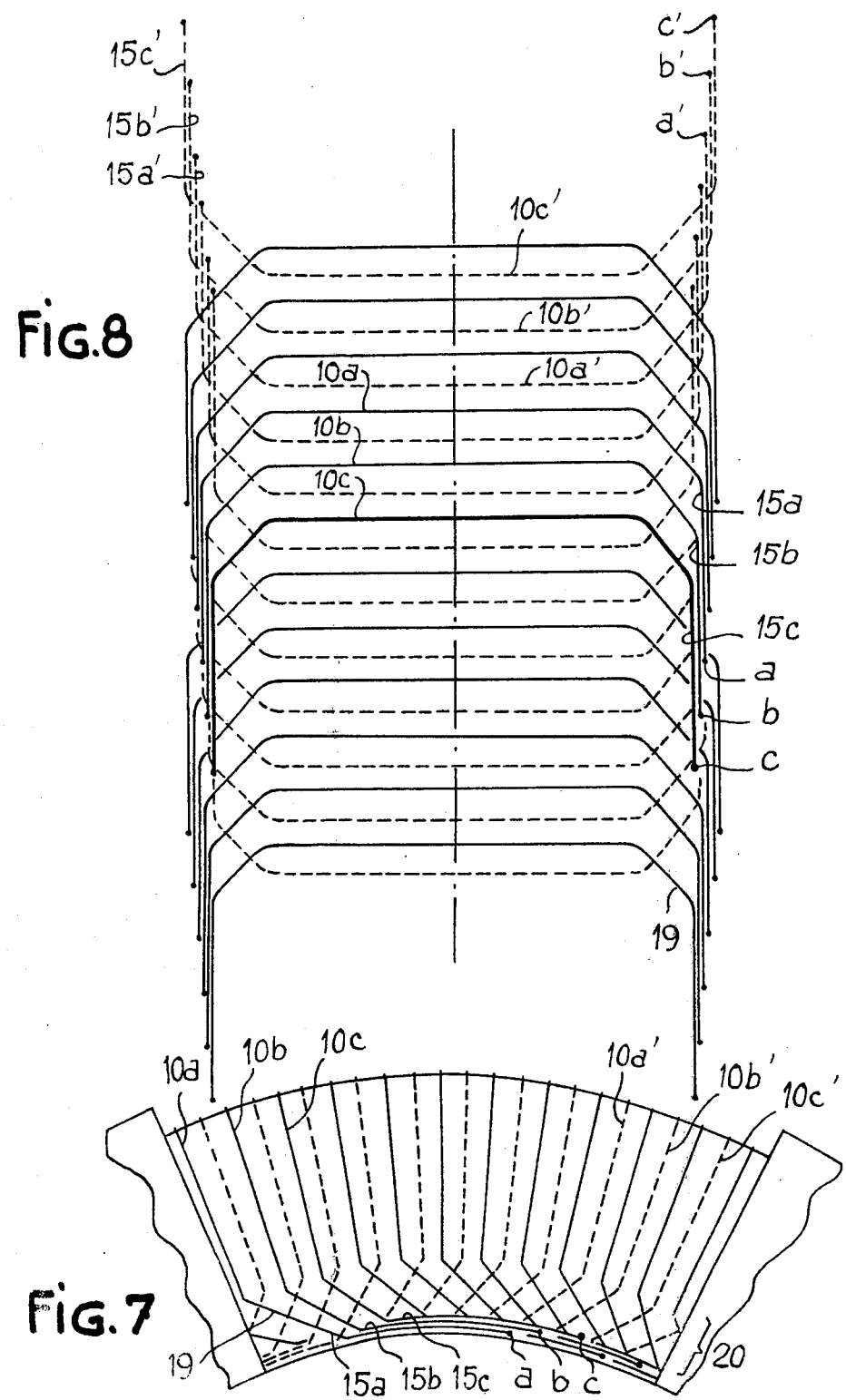

TIRE HAVING ENDS OF CARCASS CORDS EXTENDING CIRCUMFERENTIALLY IN BEAD AREA

The present invention relates to tires of the type having a radial carcass, that is a carcass which is formed of transverse arcs or hoops of flexible cord which are oriented, at least in the zones of the flanks or sidewalls along the radial or meridian planes of the tire.

With the classical tire of this kind, the carcass is generally made from one or several layers or "plies" of flexible parallel cords coated with rubber. These layers or plies are individually laid over a drum of a tire building machine in order to form a tubular outline, the lateral parts of which are then turned around circular bead cores of steel thus forming the reinforced structure of the beads of the tire.

In the turned up layers of the lateral parts of the carcass, the cords are also radially oriented and the edges of these lateral parts are delimited by the edges cut from the cords of the layers. It is known that these cut edges or ends form critical points, subject to loosening or detachment from the rubber during operation, especially when these edges are located in zones of the sidewalls of the tire being subjected to repeated deflections.

It has already been proposed to make the carcass of radial tires not out of calendered cord plies of cables, but of a continuous cord or cable that is laid to form spaced arcs or hoops (each in a meridian plane) connected by circumferential portions longitudinally extending along one or the other bead, whereby the circumferential portions of this cable are juxtapositioned with the circumferential portions of the adjoining arcs to form longitudinal bundles of cables which make up the reinforcing structure of the beads. See U.S. Pat. No. 3,815,652.

A tire made this way may be dispensed of any continuous circular bead core in its beads and the carcass does not have lateral parts turned up radially with the edges delimited by cut cables. Tires of this kind are extremely strong in the zones of the beads.

A primary object of the invention is to provide improvements in this type of tire and this objective is obtained by constructing the carcass not with only one continuous cord, but with individual cords for each arc or hoop in a meridian plane across the tire, with the ends of these individual cords being bent to extend by circumferential portions which juxtapose with the similar circumferential portions of the adjoining arcs to form the reinforced structure of the beads of this tire.

The invention is herebelow described in more detail with reference to the accompanying drawings in which:

FIGS. 7 and 8 are a partial view in elevation and a developed schematic planar view of a carcass in another embodiment;

In these drawings, the reinforcing cords or cables of the carcass of the various embodiments of the tire are shown more spaced for better clearness of the drawings, but it will be understood that in the practice a larger number of cords or cables exist and that these are more closely spaced.

Figure 1:
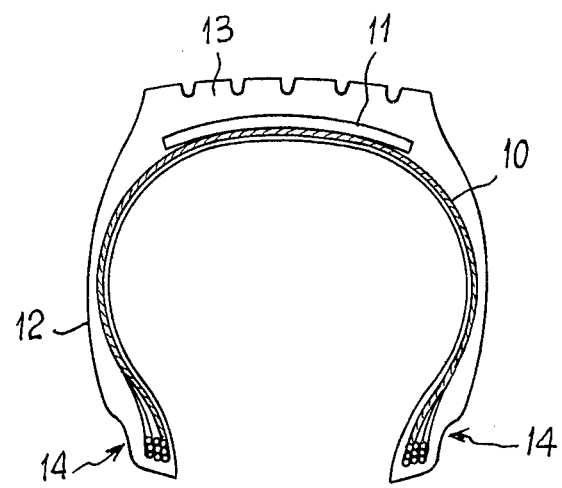
FIGS. 1, 2 and 3 show a view in cross-section, a partial view in elevation and a developed schematic planar view of carcass in a first embodiment of the tire of the invention.
Figure 2:
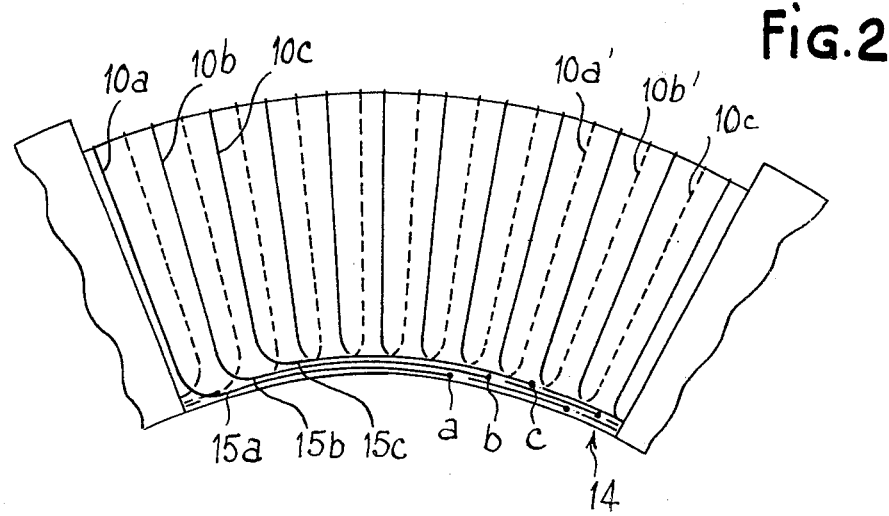
Figure 3:
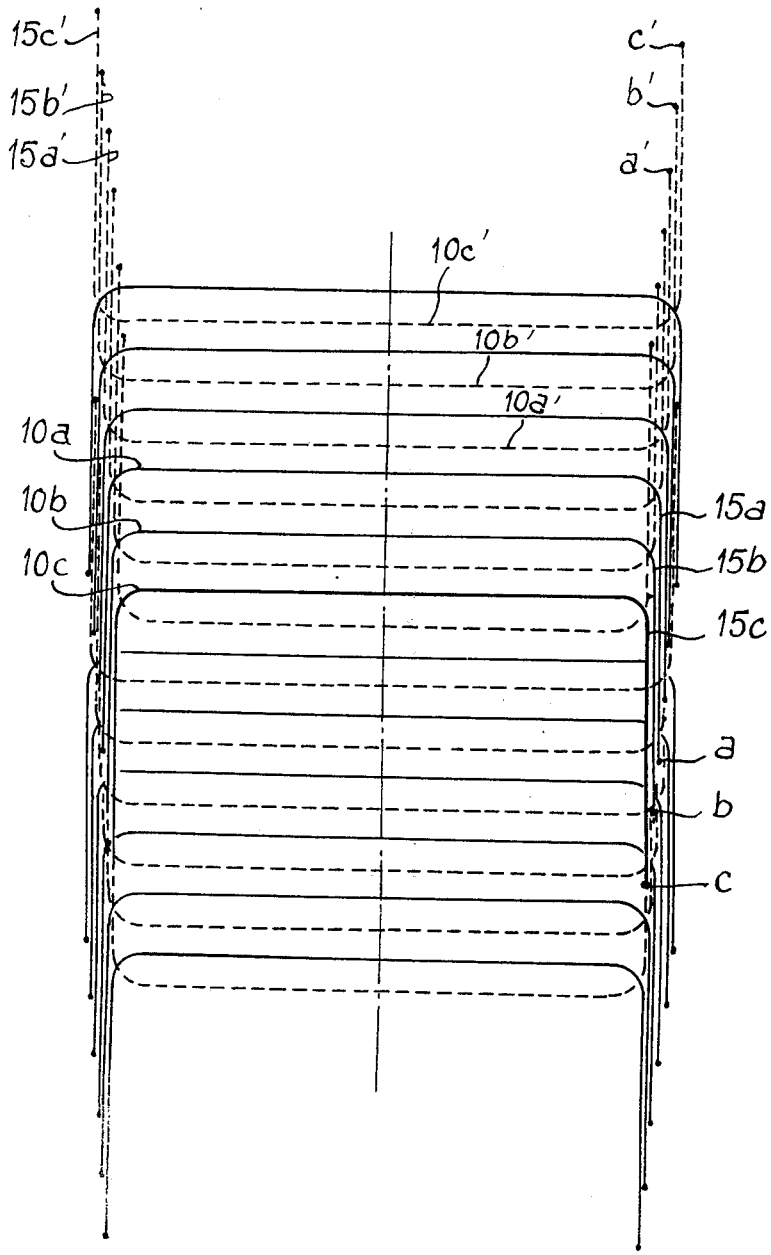

In the embodiment of FIGS. 1, 2 and 3, the tire comprises a carcass 10 constructed of adjoining meridian arcs or hoops of cord or cable contained in the same semi-toroidal surface. The portion of the tire above the carcass is reinforced by a belt 11 and the carcass is covered by the sidewall rubber strips 12 and the rubber tread 13. The lower edges of the carcass 10 are embedded into the beads 14 serving to seat the tire over the rim of the wheel.

The meridian hoops in the carcass are each formed of a flexible cord or cable, the ends of which are bent upon arriving into the beads in order to provide elongated portions extending circumferentially within the beads. In the illustrated embodiment, the carcass comprises two series of meridian hoops, 10a, 10b, 10c, etc. (shown in solid lines) and 10a', 10b', 10c', etc. (shown in dotted lines); all the hoops are contained in the same surface of rotation of the carcass about the axis of rotation of the tire and the hoops of one series are alternating with the hoops of the other series. The ends 15a, 15b and 15c of the hoops of series 10a, 10b, and 10c are extending circumferentially in one direction and respectively end at a, b and c in the beads (FIG. 2).

Figure 4:
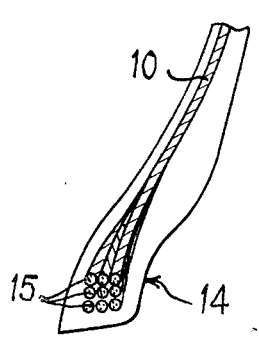
FIG. 4 is a partial view in section showing the structure of a bead of the tire, shown in FIG. 1.

The ends 15a', 15b' and 15c' of the hoops of the other series 10a', 10b' and 10c' are extending circumferentially in the opposite direction as can be seen from the view of FIG. 3, and they also end in the manner shown in a', b' and c' in the beads. The circumferential portions 15 of the adjoining hoops are located side by side along a certain length in the form of a longitudinal bundle of cords or cables thus making up the circumferential reinforced structure of each bead. FIG. 4 shows on large scale the structure of the beads 14; whereas in the body of the carcass 10, the meridian hoops are located side by side in the same surface as the cables of the layer of cord, the lateral portions of the hoops somewhat spread out in the beads to allow the circumferential portions 15 to juxtapose in a bundle which fulfills the role of the normal reinforcing core of the bead. This bundle is embedded into the rubber of the bead assuring the lateral connection of the elements of this bundle. This rubber preferably has a high modulus of elasticity to reinforce the cohesion of the unit. In this assembly, the resistance in the circumferential direction depends partly on the length and of the number of the longitudinal portions being juxtaposed and connected with each other by the rubber. This length can, however, vary according to the tenacity of the cords or cables and the modulus of the connecting rubber. It has been considered in the meantime that the length of the longitudinal portions has to be equal to at least 8% of the circumference of the bead in order to have a sufficient length of juxtaposition. The arrangement of the longitudinal juxtaposed portions 15 can also vary somewhat. This arrangement can form a compact bundle or a bundle having a section elongated either in the vertical or horizontal direction. It can be completed by additional reinforcing elements such as thin strips or profiled rubber strips in order to give the bead an increased resistance or to provide the form of a particular section for the mounting and the seating on the rim on a wheel.

Figure 5:
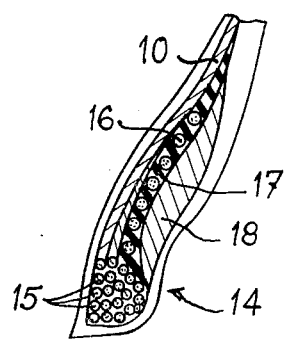
FIGS. 5 and 6 are partial views showing two other embodiments of the structures of beads.

FIG. 5 shows an embodiment of another structure of a bead 14, where the bundle of the circumferentially arranged longitudinal portions 15 is additionally reinforced by a circumferential winding or coiling of a cable 16 with several turns raising towards the flank beginning from the bundle of the portions 15, this winding being applied against the outside surface of the carcass 10. The winding is embedded into a hard rubber 17 flanked at the outside by a reinforced filler section 18, these two elements becoming thinner at the top to join each other gradually at the sidewall of the carcass 10. The unit is embedded in the rubber surrounded with the bead 14 and covered at the outside by the strip of the sidewall 12.

Figure 6:
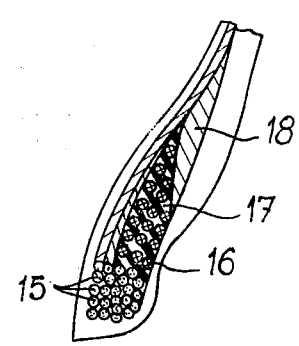

FIG. 6 shows a structure of a bead similar to the one in FIG. 5, but in which several circumferential windings of cords or cables are embedded in hard rubber 17 and are extended by a filling section 18. The winding 16 can be obtained with the same cord or cable as the one used for the carcass 10 or with a cord or cable of different nature, for example of steel.

FIGS. 7 and 8 as illustrated in a manner similar to that in FIGS. 2 and 3, show a tire, in which the meridian arcs or hoops of the carcass 10 are connected to the circumferential justaposed portions 15 by oblique or slanting portions 19. In the finished carcass, these oblique portions cross each other in the transitional zones 20 located between the beads 14 and the sidewalls of the carcass. By conveniently selecting the length and the inclination of these oblique portions 19, the height of these transitional zones 20 can be varied to give these parts of the carcass the resistance to stresses which they have to endure and especially the rotation torque. These oblique portions 19 which are oriented for instance between 10° and 60° with respect to the radial portions, can be replaced by curved connecting portions.

Figure 9:
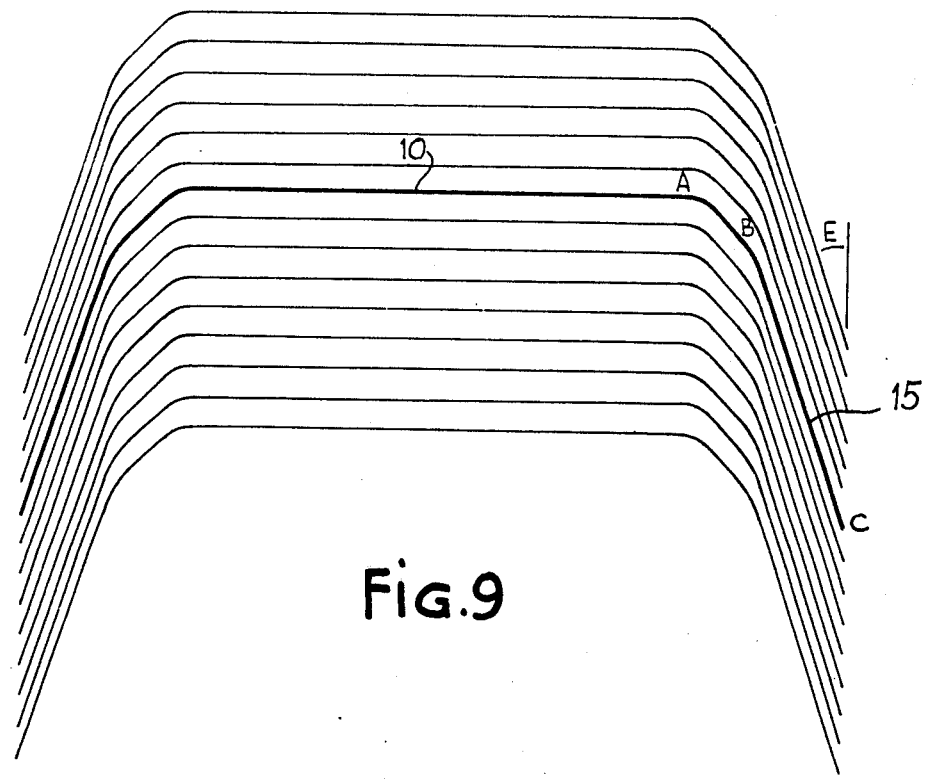
FIGS. 9 and 10 show a developed schematic planar view of a carcass and a schematic view in cross-section of the contour of the carcass in another embodiment of the tire according to the invention.
Figure 10:
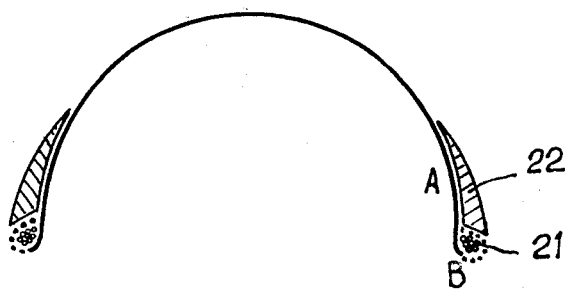

FIGS. 9 and 10 show schematically another embodiment of the invention in which the carcass 10 is formed of a single series of successive meridian arcs, the ends 15 of which are all bent in the same direction and juxtaposed under the form of lateral, flat bundles, that is the cords or cables are continuously disposed in a cylinder shaped arrangement. The ends 15 are obliquely curved or oriented in the zone AB, then bent following a second orientation in the zone BC in a way to form a very low angle E going so far to bring the connecting cords or cables into this zone. These flat bundles are then connected either on top of each other, or around an auxiliary bead core 21 placed in each bead 14 in a way that the portions 15 fold themselves around this core following a screw with an elongated thread. Preferably, the width of the flat, lateral bundles or cables is sufficiently narrow so that the edges delimited by the cut ends of cables remain at the level of the core 21; this means the ends are included in the bead 14 instead of extending into the zone of the sidewall.

Preferably, these cut ends of the cords or cables are connected until they rejoin the carcass in the neighborhood of point B (shown in FIG. 10). In this case the most suitable auxiliary core 21 presents an upper, slenderized portion. In this way, the ends of the cables are located in a neutral (motionless) zone of the tire, and the filler section presents at its lower part a slenderized shape, whereby this section is more suitable to endure the alternate deflections to which it is submitted, when the tire is in operation.

Figure 11:
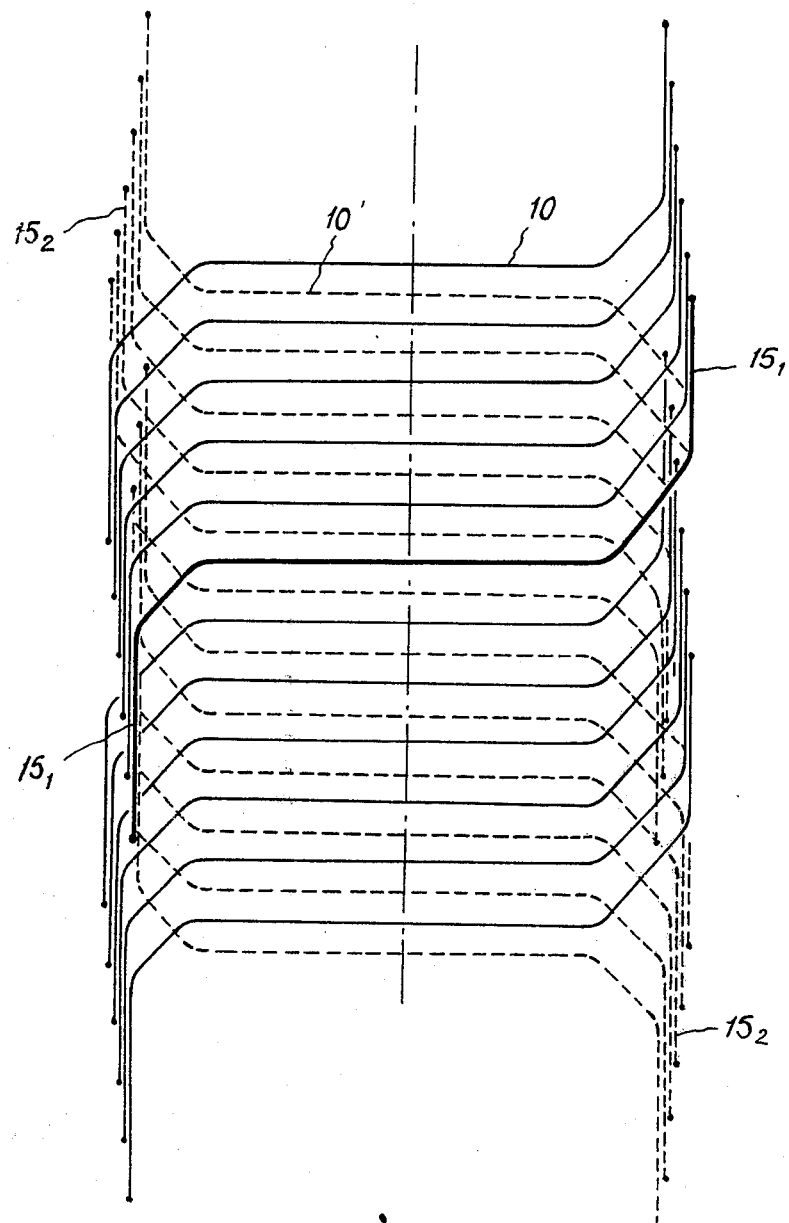
FIG. 11 is a developed schematic view of still another carcass construction.

In the arrangement of the carcass according to FIG. 11 the carcass comprises two series of alternate cable hoops 10 and 10', like in the case of FIGS. 1–3, but the ends $15_1$–$15_2$ of the hoops of each series are bent in the opposite direction in a way that the cords or cables of the carcass have - in the developed stage of the carcass shown in FIG. 1 — an S or Z-shape. The ends $15_1$–$15_2$ cross each other very obliquely in the lateral bundles thereby forming two superimposed layers of cables. These flat, lateral bundles are then connected, either directly against the lower lateral parts of the carcass 10, or around an auxiliary bead core 21 surmounted by the rubber section 22, or else around a hard rubber section made more narrow towards the top.

Figure 12:
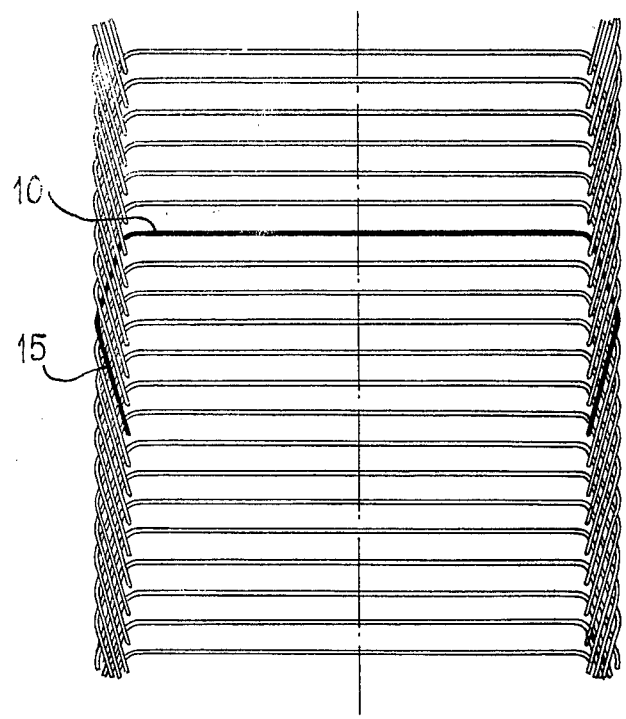
FIGS. 12, 13 and 14 show a developed view of another carcass, a cross-section of the contour of this carcass and a partial view in elevation of another tire provided with this carcass.
Figure 13:
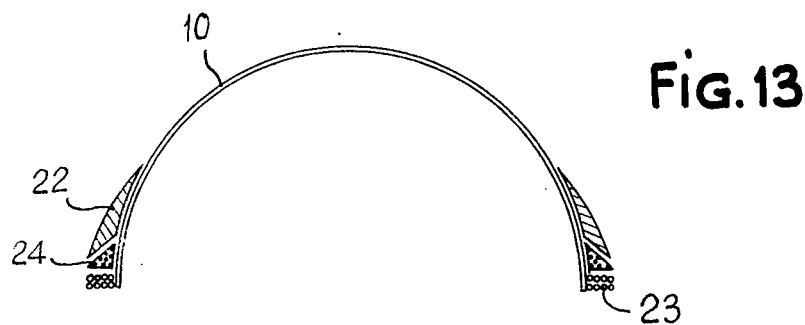
Figure 14:
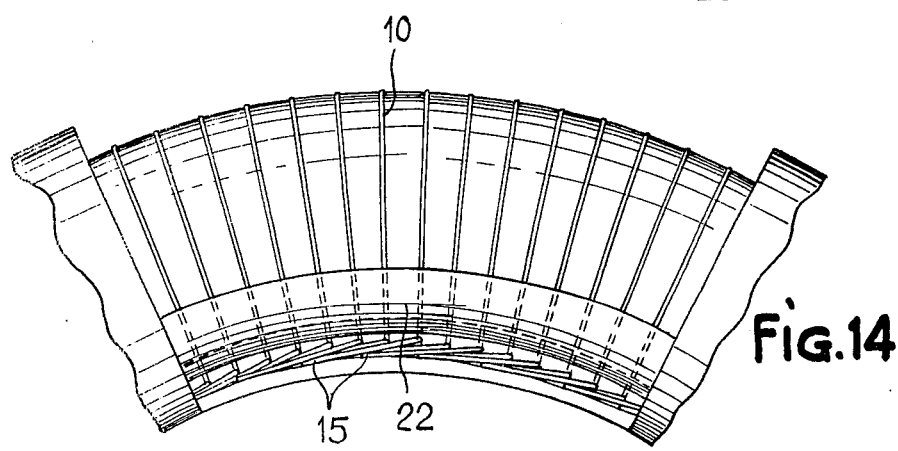

The FIGS. 12, 13, 14 show another embodiment derived from the one of FIGS. 9 and 10, in which the flat lateral bundles formed by the oblique juxtaposed portions 15 all being oriented in the same direction, are directly connected on top of each other to form a sort of twisted rod 23 making up the reinforced structure of each bead 14. The so-connected bundles can still be reinforced by a continuous bead core 24 surmounted by a filler section of hard rubber 22.

The cords or cables used for constructing the carcass 10 and the other elements of the tire can obviously be one of the normal textile cords made from rayon, polyamide, polyester, etc., but preferably materials having a high modulus of elasticity would be used such as cables of glass, cables of carbon and metallic cables made from very thin elementary filaments or fibers having a high flexibility. These cables are generally treated with adhesive materials to enhance adherence to rubber and they can previously be coated with rubber solutions, or can be coated or wrapped with a cover of raw rubber obtained by letting the cable pass or run in a suitable extruding machine.

What is claimed is:

1. A tire of the pneumatic type having a tread, sidewalls, a radial carcass within said sidewalls and extending under said tread, and beads at the rim engaging edges of said sidewalls, said carcass being formed of individual meridian arcs of reinforcing cords or cables with the ends of the individual cords or cables being bent in an area of each bead to provide cable portions that extend circumferentially in each bead, the circumferentially extending portions of one cord or cable being juxtaposed with respect to circumferentially extending portions of the adjoining cords or cables to form longitudinal bundles of cords or cables which make up a reinforcing structure of the beads.

2. A tire according to claim 1, in which the carcass is formed by a first series of meridian arcs, the ends of which are bent and extended by the circumferentially directed portions in one direction, and by a second series of meridian arcs, the ends of which are bent and extended by the circumferentially directed portions in the opposite direction, whereby the hoops of the first series are alternating with the arcs of the second series.

3. A tire according to claim 1, in which the meridian arcs are continuous and are disposed in the same semitoroidal surface of the carcass of the tire.

4. A tire according to claim 2, in which each of the meridian arcs are continuous and all the hoops are disposed in the same semi-toroidal surface of the carcass of the tire.

5. A tire according to claim 1, in which the circumferential portions are extended a distance at least equal to 8% of the circumference of the beads.

6. A tire according to claim 1, in which the meridian arcs are connected with the circumferential portions by oblique bands crossing each other in a transitional zone between the beads and the sidewalls in order to form a structure more resistant to rotation torque.

7. A tire according to claim 1, in which the meridian arcs are connected with a circumferential portion by curved bends crossing each other in a transitional zone between the beads and the sidewalls in order to form a structure more resistant to rotation torque.

8. A tire according to claim 1, in which the circumferential portions of the adjoining arcs are juxtaposed in the form of a flat bundle which is then folded on top of itself.

9. A tire according to claim 1, in which the circumferential portions of the adjoining arcs are juxtaposed in the form of a flat bundle which is then folded around an auxiliary bead core.

10. A tire according to claim 1, in which meridian hoops of individual cables are disposed closely spaced from each other throughout the carcass.

* * * * *